United States Patent [19]

Bianco

[11] Patent Number: 5,374,816
[45] Date of Patent: Dec. 20, 1994

[54] OPTICAL METHOD AND APPARATUS FOR AUTHENTICATING DEGAUSSED MAGNETIC IDENTIFICATION MEANS

[76] Inventor: James S. Bianco, 217 Brainard Rd., Enfield, Conn. 06082

[21] Appl. No.: 990,502

[22] Filed: Dec. 15, 1992

Related U.S. Application Data

[63] Continuation-in-part of Ser. No. 921,460, Jul. 28, 1992, abandoned, which is a continuation-in-part of Ser. No. 857,729, Mar. 26, 1992, abandoned, which is a continuation-in-part of Ser. No. 810,483, Dec. 19, 1991, abandoned.

[51] Int. Cl.$^5$ ............................................. G06K 7/10
[52] U.S. Cl. ....................................... 235/454; 235/457
[58] Field of Search .................. 235/454, 457; 359/2; 340/825.34; 283/91

[56] References Cited

U.S. PATENT DOCUMENTS

| | | | |
|---|---|---|---|
| 4,013,894 | 3/1977 | Foote | 250/569 |
| 4,034,211 | 7/1977 | Horst | 235/454 |
| 4,094,462 | 6/1978 | Moschner | 235/419 |
| 4,143,810 | 3/1979 | Greenaway | 235/487 |
| 4,450,348 | 5/1984 | Stockburger et al. | 235/380 |
| 4,464,566 | 8/1984 | Silverman et al. | 235/382 |
| 4,575,624 | 3/1986 | Klinkhardt | 235/449 |
| 4,641,017 | 2/1987 | Lopata | 235/457 |
| 4,684,795 | 8/1987 | Colgate, Jr. | 235/457 |
| 4,761,543 | 8/1988 | Hayden | 235/457 |
| 4,816,657 | 3/1989 | Stockburger et al. | 235/382 |
| 4,837,426 | 6/1989 | Pease et al. | 235/440 |
| 4,906,829 | 3/1990 | Iseli | 235/454 |
| 4,916,294 | 4/1990 | Goldman | 235/493 |
| 4,945,215 | 7/1990 | Fukushima et al. | 235/457 |
| 4,985,614 | 1/1991 | Pease et al. | 235/437 |
| 5,010,243 | 4/1991 | Fukushima et al. | 235/488 |
| 5,059,776 | 10/1991 | Antes | 235/457 |
| 5,117,415 | 5/1992 | Ohta et al. | 369/271 |

Primary Examiner—Davis L. Willis
Assistant Examiner—Karl D. Frech
Attorney, Agent, or Firm—John H. Crozier

[57] ABSTRACT

In a preferred embodiment, a method of authenticating an identification article, the identification article having thereon first and second optical strips bearing compound diffraction grating patterns, each optical strip including at least first and second diffraction grating elements, the method comprising: optically reading the first optical strip to detect when the first diffraction grating elements are present; and simultaneously optically reading the second optical strip to detect the relationship of the first and second diffraction grating elements on the second optical strip relative to the first diffraction grating elements on the first optical strip, thereby to develop an optical signature for the identification means.

8 Claims, 3 Drawing Sheets

OPTICAL METHOD AND APPARATUS FOR AUTHENTICATING DEGAUSSED MAGNETIC IDENTIFICATION MEANS

CROSS-REFERENCE TO RELATED APPLICATIONS

The present application is a continuation-in-part of co-pending U.S. application Ser. No. 07/921,460, filed Jul. 28, 1992, now abandoned and titled SECURE OPTOMAGNETIC IDENTIFICATION, which is a continuation-in-part of U.S. application Ser. No. 07/857,729, filed Mar. 26, 1992, abandoned, which is a continuation-in-part of U.S. application Ser. No. 07/810,483, filed Dec. 19, 1991, abandoned.

BACKGROUND OF THE INVENTION

1. Field of the Invention

The present invention relates generally to identification means having diffraction gratings and magnetic strips disposed thereon provided for security and authentication and, more particularly, but not by way of limitation, to novel method and apparatus for reading diffraction gratings on such an identification means when the magnetic strip thereon has been deGaussed.

2. Background Art

In the parents of the present application, and particularly in Ser. No. 07/921,460, there is described method and apparatus for reading a compound diffraction grating and an associated magnetic strip. Such optical images and magnetic strips are provided on identification means, such as credit cards, to assist in authentication of the identification means and to prevent or deter forgery of such identification means.

While the inventions described in the above-referenced applications provide a high level of security, a problem exists when the magnetic strip has become totally or partially deGaussed, either intentionally or accidentally. In such cases, when a deGaussed credit card is presented for a purchase, for example, the credit card will be rejected by the local authentication reader and the clerk may simply enter the identification number that is printed or embossed on the card without the authenticity of the card being verified by the local reader. Unscrupulous persons knowing of this possibility may intentionally degauss an invalid or forged credit card in the hope that the clerk may follow the above procedure.

Accordingly, it is a principal object of the present invention to provide method and apparatus for reading diffraction gratings on identification means when the magnetic strip thereon has been deGaussed.

It is a further object of the invention to provide such method and apparatus that are easily and economically employed.

Other objects of the present invention, as well as particular features, elements, and advantages thereof, will be elucidated in, or be apparent from, the following description and the accompanying drawing figures.

SUMMARY OF THE INVENTION

The present invention achieves the above objects, among others, by providing, in a preferred embodiment, a method of authenticating identification means, said identification means having thereon first and second optical strips bearing compound diffraction grating patterns, each said optical strip including at least first and second diffraction grating elements, said method comprising: optically reading said first optical strip to detect when said first diffraction grating elements are present; and simultaneously optically reading said second optical strip to detect the relationship of said first and second diffraction grating elements on said second optical strip relative to said first diffraction grating elements on said first optical strip, thereby to develop an optical signature for said identification means.

BRIEF DESCRIPTION OF THE DRAWING

Understanding of the present invention and the various aspects thereof will be facilitated by reference to the accompanying drawing figures, submitted for purposes of illustration only and not intended to define the scope of the invention, on which.

DETAILED DESCRIPTION OF THE PREFERRED EMBODIMENTS

Figure 1:
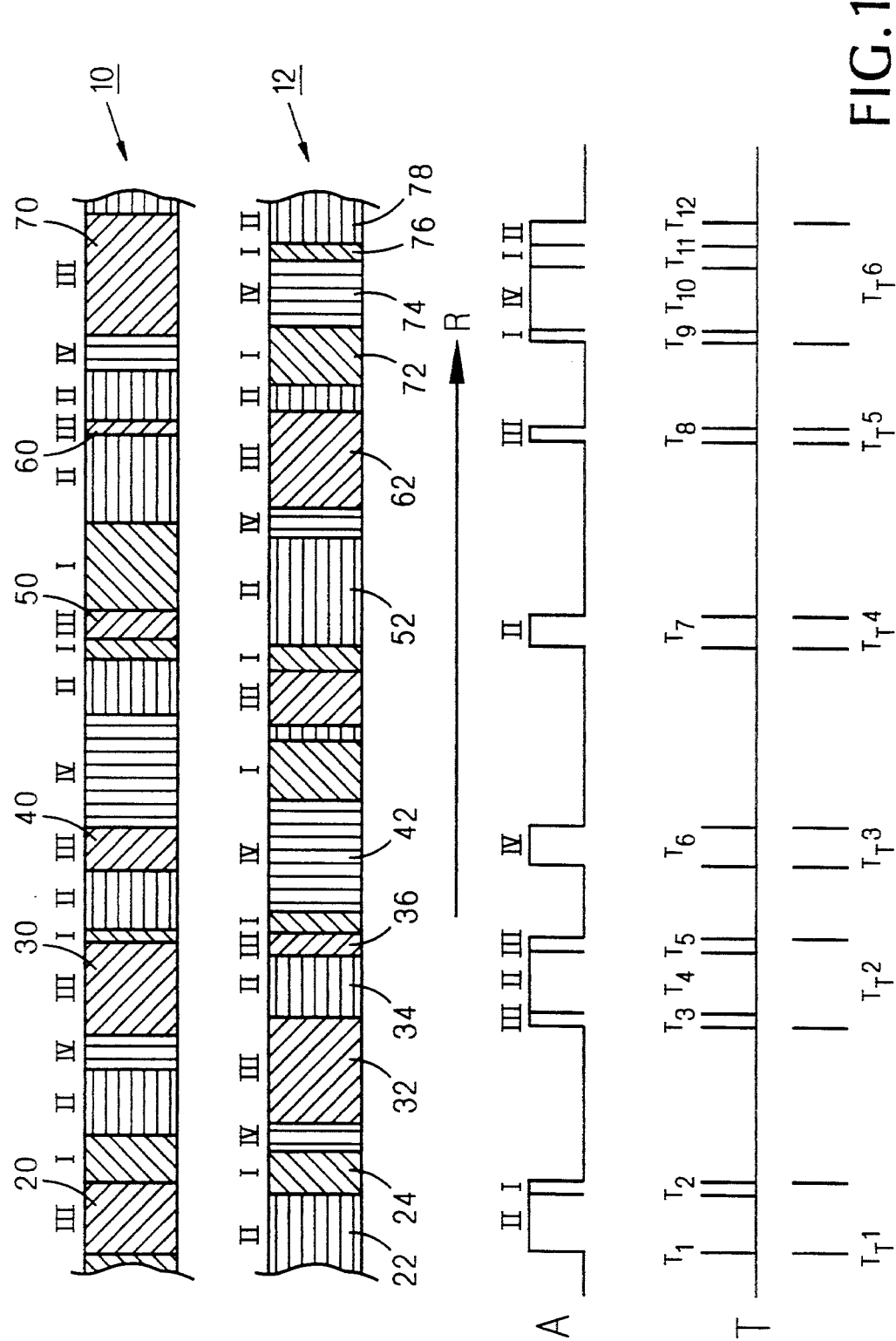
FIG. 1 illustrates schematically compound diffraction grating strips and the information derived therefrom when the magnetic strip associated therewith has been deGaussed and one method of verifying the authenticity of the substrate on which the strips are disposed.

Reference should now be made to FIG. 1 whereon is illustrated first and second compound diffracting grating strips, generally indicated by the reference numerals 10 and 12, respectively, each of which comprising a plurality of randomly arranged diffraction grating elements, types I–IV. It may be assumed that strips 10 and 12 are disposed on identification means such as a credit card (not shown). It may be assumed also that strip 10 is optically read by a first photodetector to detect the presence of type I diffraction grating elements, while strip 12 is optically read by a second photodetector to detect the presence of type II diffraction grating elements, in a manner as is described in the above referenced applications. It may be assumed further that a magnetic strip (not shown) associated with diffraction grating strips 10 and 12 has been deGaussed so that magnetic clock, data, and security information has been partially or totally erased.

The problem presented is how to authenticate the identification means in the absence of the magnetically recorded clock and security data. To overcome this problem, the present invention provides third and fourth photodetectors, with the third photodetector detecting the presence of type III diffraction grating elements on strip 10 and the fourth photodetector detecting the presence of type I diffraction grating elements on strip 12. The resulting information is used as described below to provide a unique signature for the identification means.

Assume that strips 10 and 12 are being read simultaneously in the direction of the arrow R on FIG. 1. When the first type III diffraction grating element 20 is detected on strip 10 by the third photodetector, the second and fourth photodetectors detect the diffraction grating elements on strip 12 coinciding with element 20 on strip 10 which are portions of diffraction grating elements 22 (type II) and 24 (type I). When the second type III diffraction grating element 30 is detected on strip 10, the diffraction grating elements detected on strip 12 coinciding with element 30 are a portion of diffraction grating element 32 (type III—or absence of types I or II), all of diffraction grating element 34 (type II), and a portion of diffraction grating element 36 (absence of types I or II). Likewise the coincidences with the other type III diffraction grating elements on strip 10 are as follows:

Element 40: portion of element 42 (absence of types I or II).

Element 50: portion of element 52 (type II).

Element 60: portion of element 62 (absence of types I or II).

Element 70: portion of element 72 (type I), all of element 74 (absence of types I or II), all of element 76 (type I), and a portion of element 78 (type II).

During the recording of the above information, the time increments for the detecting of each of the diffraction grating elements or portions of thereof on strip 12 are also recorded and used to provide an indication of the width of those elements or the portions thereof. For example, say the total time, $T_T1$ of detecting diffraction grating element 20 is 100 milliseconds, the time, T1, during which element 22 is detected is 80 milliseconds, and the time, T2, during which element 24 is detected is 20 milliseconds. The signature for element 20 can then be expressed as "0.8 II, 0.2 I."

Then, say that the total time, $T_T2$, of detecting diffraction grating element 30 is 130 milliseconds, the time, T3, of detecting diffraction grating element 32 is 20 milliseconds, the time, T4, of detecting diffraction grating element 34 is 95 milliseconds, and the time, T5, of detecting diffraction grating element 36 is 25 milliseconds. The signature for element 30 can be expressed as "0.15 not I or II, 0.66 II, 0.19 not I or II." Likewise, the signatures for the other type III diffraction grating elements on strip 10 can be expressed as follows:

Element 40: "1.0 not I or II."

Element 50: "1.0 II."

Element 60: "1.0 not I or II."

Element 70: "0.1 I, 0.45 not I or II, 0.20 I, 0.25 II."

The total of the individual signatures for the type III diffraction grating elements on strip 10 comprises the signature for the identification means, as shown at line S on FIG. 1.

In use, when the identification means, such as a credit card, is presented to a clerk in a store, for example, and the credit card is refused by the local reading and authenticating terminal, the host computer (not shown) is manually signalled to indicate that the identification number will be manually entered. That number is entered and, then, the card is reinserted in the local terminal and the signature of the optical image is read as above. This signature is then compared by the host computer with one previously stored for that card in the host computer to determine if the card is authentic.

While the method described above with reference to FIG. 1 may be employed satisfactorily, it requires time computations which may be affected by variations in the speed with which a credit card bearing stripes 10 and 12 is moved through a slot reader, for example.

Figure 2:
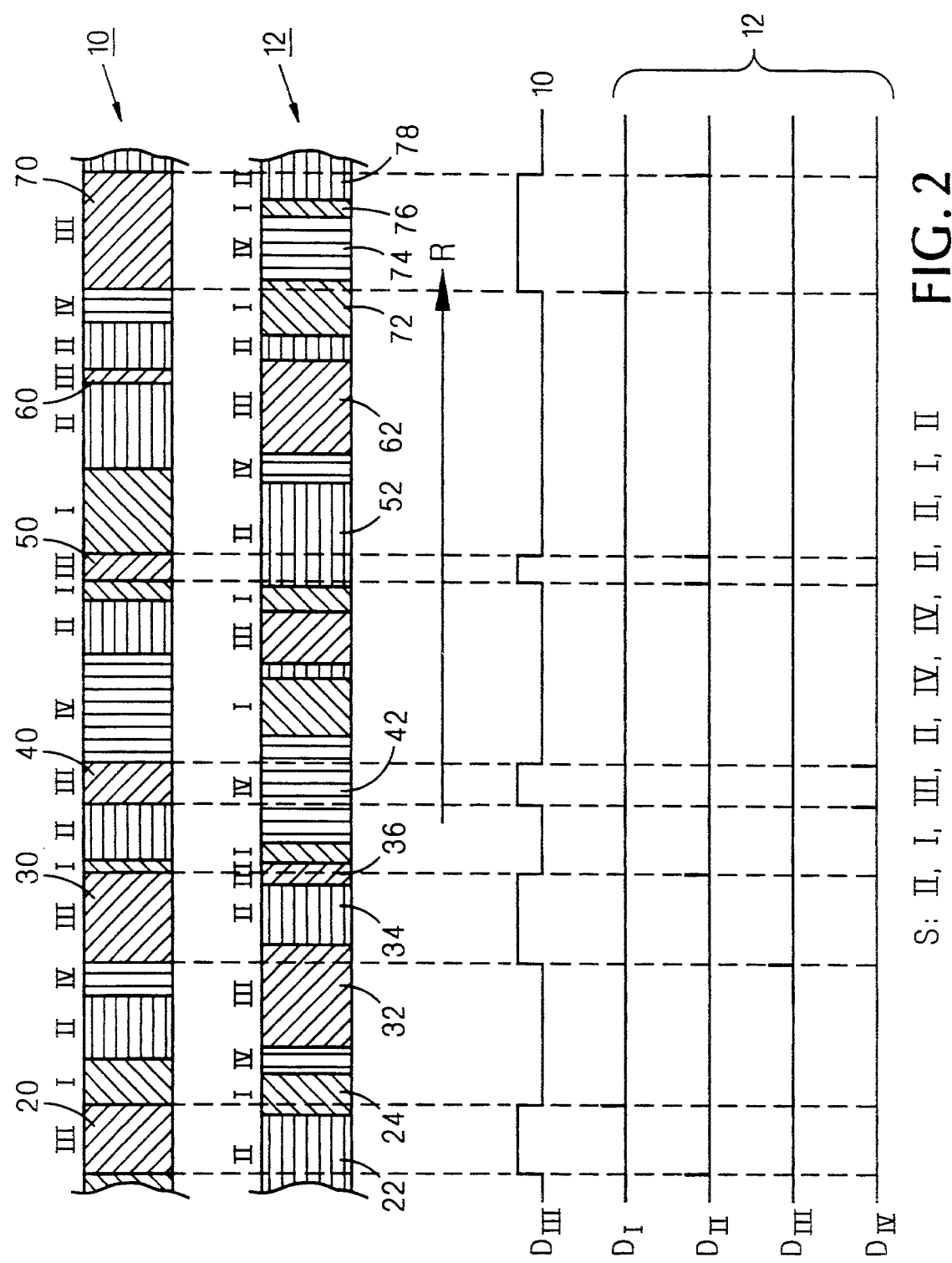
FIG. 2 illustrates another method of verification.

To eliminate time computations, the method illustrated on FIG. 2 may be employed. The basis of this method is to detect the positive and negative going transitions of a detector reading diffraction gratings of one type on one of strips 10 and 12, while detecting the types of gratings present on the other strip corresponding at the occurrences of those transitions, without regard to time intervals. Here, the output of a detector $D_{III}$ reading type III gratings on strip 10 is shown. At the positive going transition when grating element 20 (type III) on strip 10 is detected, grating element 22 (type II) is detected by a detector $D_{II}$ associated with strip 12 and the latter detector provides a positive output as shown. At the negative going transition at the end of detection of grating element 20, grating element 24 (type I) is detected on strip 12 by a detector $D_I$ associated with strip 10. Likewise, further positive and negative going transitions detected for type II grating elements on strip 10 result in the outputs of detectors $D_I$-$D_{IV}$ associated with strip 12 as shown. The resulting signature, S, for this portion of the card is then the sequence of the outputs of the latter four detectors, without regard to time.

To provide higher levels of security, the transitions of more than one type of grating element on strip 10 may be used to trigger detection of the grating types on strip 12. Also, the transitions of one or more grating types 12 on strip 10 may be used to simultaneously trigger detection of the grating types on strip 10.

While the methods of FIGS. 1 and 2 have been described with reference to reading three and four types of grating elements, respectively, the invention is not so limited and may be employed as well with the reading of a fewer or greater number of grating elements.

Figure 3:
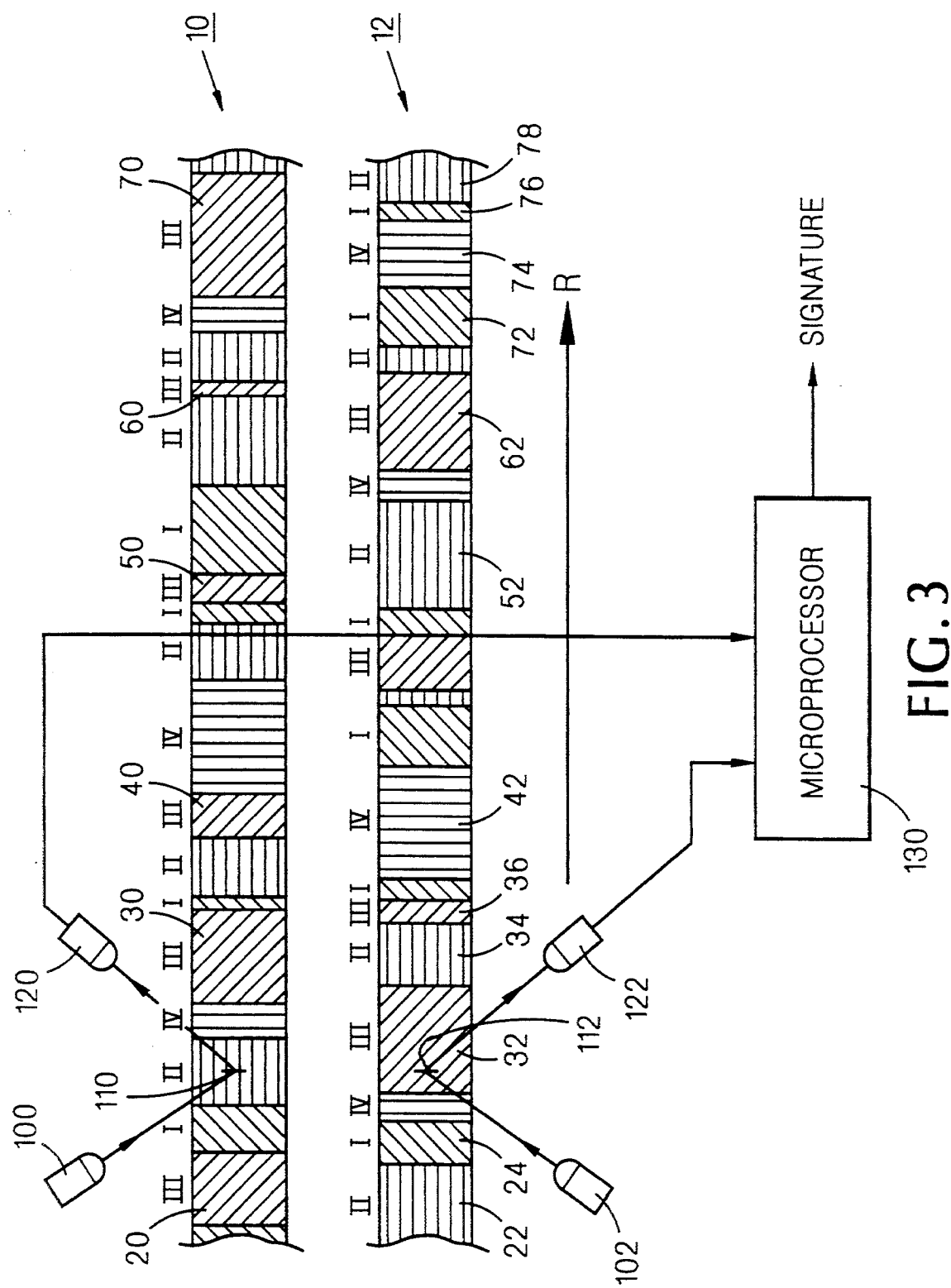
FIG. 3 is a fragmentary schematic illustration showing the physical arrangement of reading elements for practicing the present invention.

FIG. 3 illustrates the arrangement of reading elements that may be employed in the methods described above. Illumination sources 100 and 102 are disposed so as to illuminate reading spots 110 and 112, respectively, on strips 10 and 12. Photodetectors 120 and 122 are disposed so as to receive light diffracted from reading spots 110 and 112, respectively, and to provide inputs to a microprocessor 130 which, in accordance with the above methods, provides an output signature which may be sent to a host computer for comparison with a previously stored signature.

It is important that the spatial relationship between reading spots 110 and 112 and between the reading spots and the line of reading R be constant and reproducible. Preferably, reading spots 110 and 112 will lie on a line which is always orthogonal to the line of reading R.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

I claim:

1. A method of authenticating identification means, comprising:

(a) placing on said identification means a first strip of diffraction grating elements including at least first and second diffraction grating elements, said diffraction grating elements of said first strip having randomly varying widths and rotations of diffraction;

(b) placing on said identification means, a second strip of diffraction grating elements including at least first and second diffraction grating elements, said diffraction grating elements of said second strip having randomly varying widths and rotations of diffraction;

(c) optically reading said first strip to detect when a given diffraction grating element is present;

(d) simultaneously optically reading said second optical strip to detect the positional relationship of said diffraction grating elements on said second optical strip relative to said given diffraction grating element on said first optical strip, thereby to develop an optical signature for said identification means; and (e) comparing said optical signature with a previously recorded optical signature to determine the authenticity of said identification means.

2. A method, as defined in claim 1, wherein said steps of optically reading include:

(a) optically reading said first strip to determine the length of time of the first presence of said given diffraction grating element;

(b) optically reading said second strip to serially determine the lengths of time diffraction grating elements are present during said first presence of said given diffraction grating element on said first strip; and (c) calculating a first individual signature for said first presence consisting of fractions of time of presence of said diffraction grating elements during said first presence of said given diffraction grating element.

3. A method, as defined in claim 2, further comprising the step of: calculating at least one additional such individual signature combined with said first individual signature to develop a signature for said identification means.

4. A method, as defined in claim 1, wherein said steps of optically reading include:

(a) optically reading, without regard to time, said first strip to identify the beginning and the end of the first presence of a given diffraction grating element;

(b) optically reading said second strip to identify which diffraction grating elements are present during, respectively, said beginning and said end of said first presence of said given diffraction grating element on said first strip; and (c) calculating a first individual signature for said first presence consisting of the identification of the presence of said diffraction grating elements at said beginning and said end of said first presence of said given diffraction grating element.

5. A method, as defined in claim 4, further comprising the step of: calculating at least one additional such individual signature combined with said first individual signature to develop a signature for said identification means.

6. A system for authenticating identification means, comprising:

(a) a first strip of diffraction grating elements disposed on said identification means including at least first and second diffraction grating elements, said diffraction grating elements of said first strip having randomly varying widths and rotations of diffraction;

(b) a second strip of diffraction grating elements disposed on said identification means including at least first and second diffraction grating elements, said diffraction grating elements of said second strip having randomly varying widths and rotations of diffraction;

(c) means to optically read said first strip to detect when a given diffraction grating element is present;

(d) means to simultaneously optically read said second optical strip to detect the positional relationship of said diffraction grating elements on said second optical strip relative to said given diffraction grating element on said first optical strip, thereby to develop an optical signature for said identification means; and (e) means to compare said optical signature with a previously recorded optical signature to determine the authenticity of said identification means.

7. A system, as defined in claim 6, wherein said means to optically reading include:

(a) means to optically read said first strip to determine the length of time of the first presence of a given said diffraction grating element;

(b) means to optically read said second strip to serially determine the lengths of time diffraction grating elements are present during said first presence of said given diffraction grating element on said first strip; and (c) means to calculate a first individual signature for said first presence consisting of fractions of time of presence of said diffraction grating elements during said first presence of said given diffraction grating element.

8. A system, as defined in claim 6, further comprising:

(a) means to optically read, without regard to time, said first strip to identify the beginning and the end of the first presence of a given diffraction grating element;

(b) means to optically read said second strip to identify which of said at least first and second diffraction grating elements are present during respectively, said beginning and said end of said first presence of said given diffraction grating element on said first strip; and (c) means to calculate a first individual signature for said first presence consisting of the identification of the presence of said diffraction grating elements at said beginning and said end of said first presence of said given diffraction grating element.

* * * * *